US011847487B2

(12) United States Patent
Shahar et al.

(10) Patent No.: US 11,847,487 B2
(45) Date of Patent: *Dec. 19, 2023

(54) TASK COMPLETION SYSTEM ALLOWING TASKS TO BE COMPLETED OUT OF ORDER WHILE REPORTING COMPLETION IN THE ORIGINAL ORDERING MY

(71) Applicant: MELLANOX TECHNOLOGIES, LTD., Yokneam (IL)

(72) Inventors: Ariel Shahar, Jerusalem (IL); Roee Moyal, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 72 days.

This patent is subject to a terminal disclaimer.

(21) Appl. No.: 17/331,657

(22) Filed: May 27, 2021

(65) Prior Publication Data

US 2021/0286646 A1   Sep. 16, 2021

Related U.S. Application Data

(63) Continuation of application No. 16/571,122, filed on Sep. 15, 2019, now Pat. No. 11,055,130.

(51) Int. Cl.
*G06F 9/46* (2006.01)
*G06F 9/48* (2006.01)
*G06F 9/54* (2006.01)

(52) U.S. Cl.
CPC ............ *G06F 9/4843* (2013.01); *G06F 9/546* (2013.01); *G06F 2209/548* (2013.01)

(58) Field of Classification Search
CPC ... G06F 9/4843; G06F 9/546; G06F 2209/548
See application file for complete search history.

(56) References Cited

U.S. PATENT DOCUMENTS

| 5,339,449 A | 8/1994 | Karger et al. |
| 5,802,394 A | 9/1998 | Baird et al. |
| 6,718,370 B1 | 4/2004 | Coffman et al. |

(Continued)

OTHER PUBLICATIONS

U.S. Appl. No. 16/571,220 Office Action dated Jun. 30, 2022.

(Continued)

*Primary Examiner* — Michael W Ayers
(74) *Attorney, Agent, or Firm* — KLIGLER & ASSOCIATES PATENT ATTORNEYS LTD

(57) ABSTRACT

A method using a memory and queue handling logic, including accessing a work control structure (WCS) configured "first-in-first-out" holding work control records (WCRs) each including a field defining work to be carried out and a completion indicator indicating whether the work has completed, and initially set to indicate that the work has not completed: upon fetching a work request (WR) for execution, pushing a WCR corresponding to the WR to the WCS, and: A) inspecting the WCR at a head of the WCS, B) when the completion indicator of the WCR at the head of the WCS indicates that the unit of work associated with the WCR at the head of the WCS has been completed, popping the WCR at the head of the WCS from the WCS, and reporting completion of the WCR at the head of the WCS to a host processor, and C) iteratively performing A, B, and C.

20 Claims, 2 Drawing Sheets

(56) References Cited

U.S. PATENT DOCUMENTS

| | | | |
|---|---|---|---|
| 6,789,143 B2 | 9/2004 | Craddock et al. | |
| 7,013,419 B2 | 3/2006 | Kagan et al. | |
| 7,149,819 B2 | 12/2006 | Pettey | |
| 7,152,122 B2 | 12/2006 | Kagan et al. | |
| 7,912,988 B2 | 3/2011 | Boyd et al. | |
| 7,945,911 B1* | 5/2011 | Garthwaite | G06F 9/4843 707/814 |
| 8,463,966 B2 | 6/2013 | Riocreux et al. | |
| 8,813,245 B1* | 8/2014 | Corley | H04N 19/40 709/229 |
| 9,026,744 B2 | 5/2015 | Hofmann et al. | |
| 9,104,512 B2 | 8/2015 | BlockSome et al. | |
| 9,471,402 B1 | 10/2016 | Bayareddy et al. | |
| 10,051,038 B2 | 8/2018 | Makhervaks et al. | |
| 10,558,581 B1* | 2/2020 | Lazier | G06F 21/6218 |
| 10,698,767 B1* | 6/2020 | De Kadt | G06F 16/2315 |
| 11,055,130 B2 | 7/2021 | Shahar et al. | |
| 11,416,294 B1* | 8/2022 | Davis | G06F 9/5005 |
| 2005/0050188 A1* | 3/2005 | Davis | G06F 16/902 707/E17.038 |
| 2006/0184949 A1 | 8/2006 | Craddock et al. | |
| 2007/0088871 A1* | 4/2007 | Kwong | G06F 9/546 710/39 |
| 2007/0208820 A1 | 9/2007 | MakherVaks et al. | |
| 2007/0256058 A1 | 11/2007 | Marfatia et al. | |
| 2008/0275989 A1* | 11/2008 | Ebersole | H04L 12/4625 709/225 |
| 2009/0168786 A1* | 7/2009 | Sarkar | H04L 41/5054 370/396 |
| 2011/0055531 A1 | 3/2011 | Bellows et al. | |
| 2011/0082985 A1 | 4/2011 | Haines et al. | |
| 2015/0143384 A1 | 5/2015 | Lojewski | |
| 2015/0379424 A1 | 12/2015 | Dirac et al. | |
| 2016/0026604 A1 | 1/2016 | Pandit et al. | |
| 2016/0246641 A1 | 8/2016 | Kogan et al. | |
| 2016/0283415 A1 | 9/2016 | McBride et al. | |
| 2018/0217754 A1 | 8/2018 | Lee | |
| 2018/0349145 A1 | 12/2018 | Tye et al. | |
| 2018/0365053 A1* | 12/2018 | Burroughs | G06F 9/4881 |
| 2019/0034381 A1 | 1/2019 | Burstein et al. | |
| 2020/0073713 A1* | 3/2020 | Nield | G06F 1/329 |
| 2020/0257555 A1 | 8/2020 | Underwood et al. | |
| 2020/0301753 A1 | 9/2020 | Havlir et al. | |
| 2020/0356419 A1 | 11/2020 | Jacob et al. | |
| 2020/0401458 A1* | 12/2020 | Roy | G06F 9/4887 |
| 2021/0081207 A1 | 3/2021 | Shahar et al. | |

OTHER PUBLICATIONS

EP Application # 20195810.5 Search Report dated Feb. 4, 2021.
Kuperstein et al., "Automatic Inference of Memory Fences", Published in Formal Methods in Computer Aided Design, pp. 1-9, Oct. 20-23, 2010.
Wikipedia, "Memory barrier", pp. 1-4, Apr. 5, 2019.
Howells et al., "Linux Kernel Memory Barriers", pp. 1-48, Jun. 19, 2019.
McKenney., "Memory Barriers: a Hardware View for Software Hackers", Linux Technology Center, pp. 1-28, Jul. 3, 2010.
U.S. Appl. No. 16/571,220 Office Action dated Dec. 24, 2021.
U.S. Appl. No. 16/571,220 Office Action dated Nov. 10, 2022.
U.S. Appl. No. 16/571,220 Office Action dated May 5, 2023.

* cited by examiner

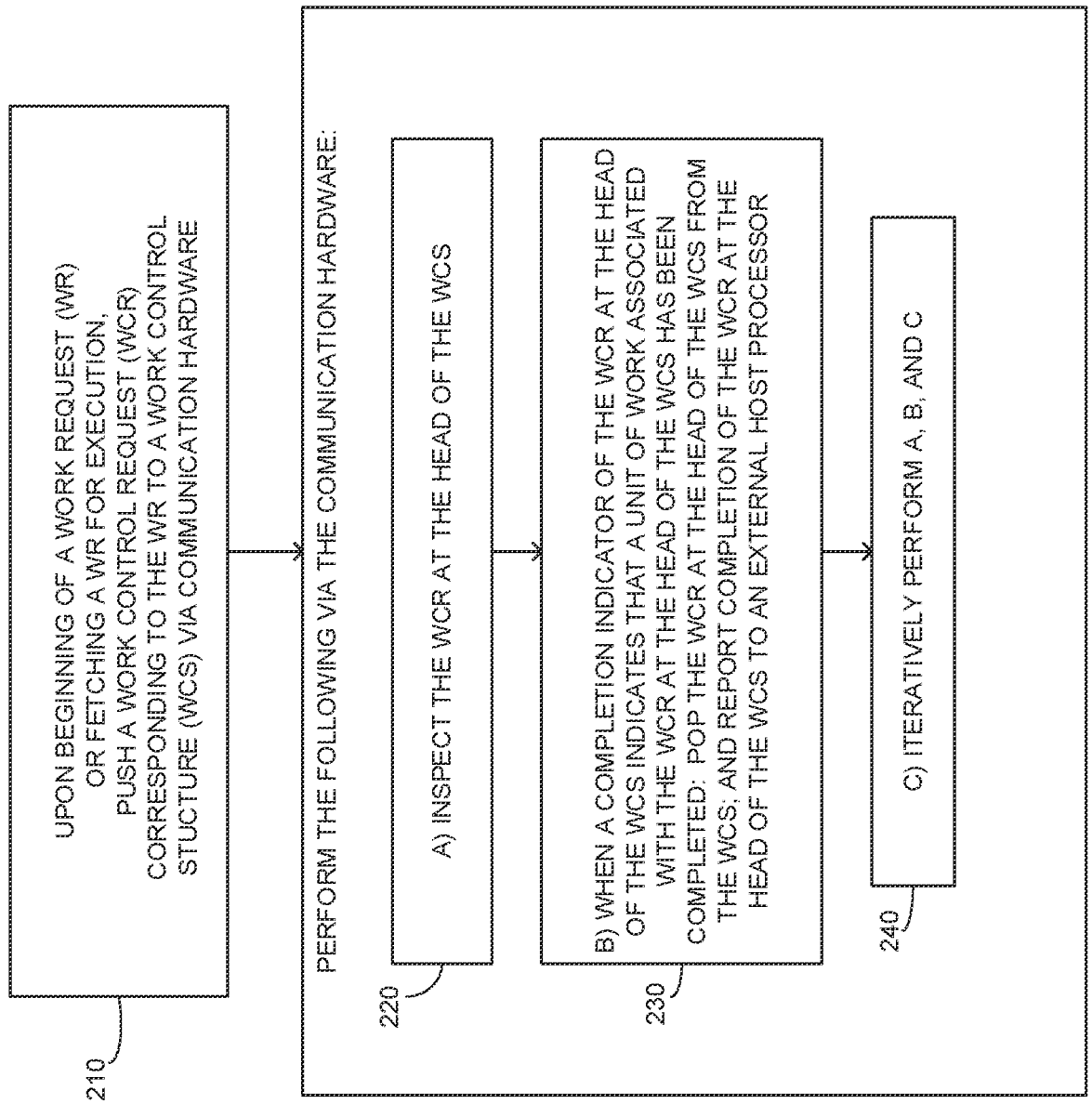

TASK COMPLETION SYSTEM ALLOWING TASKS TO BE COMPLETED OUT OF ORDER WHILE REPORTING COMPLETION IN THE ORIGINAL ORDERING MY

RELATED APPLICATION INFORMATION

The present application is a Continuation of U.S. Ser. No. 16/571,122 of Shahar et al, filed 15 Sep. 2019.

FIELD OF THE INVENTION

The present invention relates in general to systems and methods for reporting task completion.

BACKGROUND OF THE INVENTION

When tasks are queued (posted) for execution, but task execution does not necessarily take place in the same order in which the tasks were posted, in certain circumstances issues may arise because indication/s of task completion will not take place in the same order in which the tasks are queued (posted).

SUMMARY OF THE INVENTION

The present invention, in certain exemplary embodiments thereof, seeks to provide improved systems and methods for reporting task completion. In certain exemplary embodiments, indication/s of task completion are provided in the same order in which the tasks are queued (posted), even when task execution takes place in a different order from that in which the tasks were queued (posted).

There is thus provided in accordance with an exemplary embodiment of the present invention a system including queue handling logic, the queue handling logic including communication hardware for communicating with a memory, the memory being configured to hold a work control structure (WCS) having a plurality of work control records (WCRs) the WCS being configured in a first-in-first-out manner having a head and a tail, each WCR including a work specifying field defining a unit of work to be carried out, and a completion indicator indicating whether the unit of work to be carried out has been completed, and being initially set to indicate that the unit of work to be carried out has not been completed, and the queue handling logic is configured, upon fetching a work request (WR) for execution, to push a WCR corresponding to the WR to the WCS via the communication hardware, and further configured to perform the following via the communication hardware: A) to inspect the WCR at the head of the WCS, B) when the completion indicator of the WCR at the head of the WCS indicates that the unit of work associated with the WCR at the head of the WCS has been completed: to pop the WCR at the head of the WCS from the WCS, and to report completion of the WCR at the head of the WCS to a host processor external to the system, and C) to iteratively perform A, B, and C.

Further in accordance with an exemplary embodiment of the present invention the queue handling logic is also configured to insert a WCR at the tail of the WCS.

Still further in accordance with an exemplary embodiment of the present invention the queue handling logic is configured to insert a WCR at the tail of the WCS based, at least in part, on a request originating at the host processor.

Additionally in accordance with an exemplary embodiment of the present invention at least one of the plurality of WCRs is allocated by the WCS from a global pool of WCRs.

Moreover in accordance with an exemplary embodiment of the present invention the memory is external to the system.

Further in accordance with an exemplary embodiment of the present invention the system includes the memory.

Still further in accordance with an exemplary embodiment of the present invention the communication hardware includes a bus.

Additionally in accordance with an exemplary embodiment of the present invention completion of the WCR at the head of the work queue is reported to an application running on the host processor.

Moreover in accordance with an exemplary embodiment of the present invention the system also includes work processing logic including work execution logic and completion indication logic, and the work execution logic is configured to carry out a unit of work associated with a given WCR, and the completion indication logic is configured, when the unit of work associated with the given WCR has been completed by the work execution logic, to set the completion indicator in the given WCR to indicate that the unit of work associated with the given WCR has been completed.

Further in accordance with an exemplary embodiment of the present invention the system is included in one of the following: a network element, a disk controller, and an accelerator device.

Still further in accordance with an exemplary embodiment of the present invention the system is included in a network element, and the network element includes a network interface card (NIC).

Additionally in accordance with an exemplary embodiment of the present invention the unit of work to be carried out includes a data transfer by the NIC over a hardware networking medium.

Moreover in accordance with an exemplary embodiment of the present invention the system also includes timeout logic configured, upon expiration of a timeout, to set the completion indicator of the WCR at the head of the WCS to indicate that the unit of work associated with the WCR at the head of the WCS has completed, even if the unit of work associated with the WCR at the head of the WCS has not completed.

Further in accordance with an exemplary embodiment of the present invention, when the completion indicator of the WCR at the head of the WCS is set to indicate that the unit of work associated with the WCR at the head of the WCS has completed upon expiration of the timeout, the completion indicator of the WCR at the head of the WCS is set to include an error indication.

There is also provided in accordance with another exemplary embodiment of the present invention a method including, in queue handling logic, the queue handling logic including communication hardware for communicating with a memory, the memory being configured to hold a work control structure (WCS) having a plurality of work control records (WCRs), the WCS being configured in a first-in-first-out manner having a head and a tail, each WCR including a work specifying field defining a unit of work to be carried out, and a completion indicator indicating whether the unit of work to be carried out has been completed, and being initially set to indicate that the unit of work to be carried out has not been completed, performing the following: upon fetching a work request (WR) for execution, pushing a WCR corresponding to the WR to the WCS via the communication hardware, and performing the following via the communication hardware: A) inspecting the WCR at the head of the WCS, B) when the completion indicator of the WCR at the head of the WCS indicates that the unit of work associated with the WCR at the head of the WCS has been completed popping the WCR at the head of the WCS from the WCS, and reporting completion of the WCR at the head of the WCS to a host processor external to the queue handling logic, and C) iteratively performing A, B, and C.

Further in accordance with an exemplary embodiment of the present invention the method also includes inserting a WCR at the tail of the WCS.

Still further in accordance with an exemplary embodiment of the present invention the inserting a WCR at the tail of the WCS is based, at least in part, on a request originating at the host processor.

Additionally in accordance with an exemplary embodiment of the present invention at least one of the plurality of WCRs is allocated by the WCS from a global pool of WCRs.

Moreover in accordance with an exemplary embodiment of the present invention the memory is external to the queue handling logic.

Further in accordance with an exemplary embodiment of the present invention the queue handling logic includes the memory.

Still further in accordance with an exemplary embodiment of the present invention the communication hardware includes a bus.

Additionally in accordance with an exemplary embodiment of the present invention the method also includes reporting completion of the WCR at the head of the work queue to an application running on the host processor.

Moreover in accordance with an exemplary embodiment of the present invention the following is carried out by work processing logic including work execution logic and completion indication logic: the work execution logic carrying out a unit of work associated with a given WCR, and the completion indication logic setting, when the unit of work associated with the given WCR has been completed by the work processing logic, the completion indicator in the given WCR to indicate that the unit of work associated with the given WCR has been completed.

Further in accordance with an exemplary embodiment of the present invention the queue handling logic is included in one of the following a network element, a disk controller, and an accelerator device.

Still further in accordance with an exemplary embodiment of the present invention the queue handling logic is included in a network element, and the network element includes a network interface card (NIC).

Additionally in accordance with an exemplary embodiment of the present invention the unit of work to be carried out includes a data transfer by the NIC over a hardware networking medium.

Moreover in accordance with an exemplary embodiment of the present invention the following is carried out by timeout logic: upon expiration of a timeout, setting the completion indicator of the WCR at the head of the WCS to indicate that the unit of work associated with the WCR at the head of the WCS has completed, even if the unit of work associated with the WCR at the head of the WCS has not completed.

Further in accordance with an exemplary embodiment of the present invention, when the completion indicator of the WCR at the head of the WCS is set to indicate that the unit of work associated with the WCR at the head of the WCS has completed upon expiration of the timeout, the completion indicator of the WCR at the head of the WCS is set to include an error indication.

BRIEF DESCRIPTION OF THE DRAWINGS

The present invention will be understood and appreciated more fully from the following detailed description, taken in conjunction with the drawings in which:

FIG. 2 is a simplified flowchart illustration of an exemplary method of operation of the system of FIG. 1.

DETAILED DESCRIPTION OF AN EMBODIMENT

Figure 1:
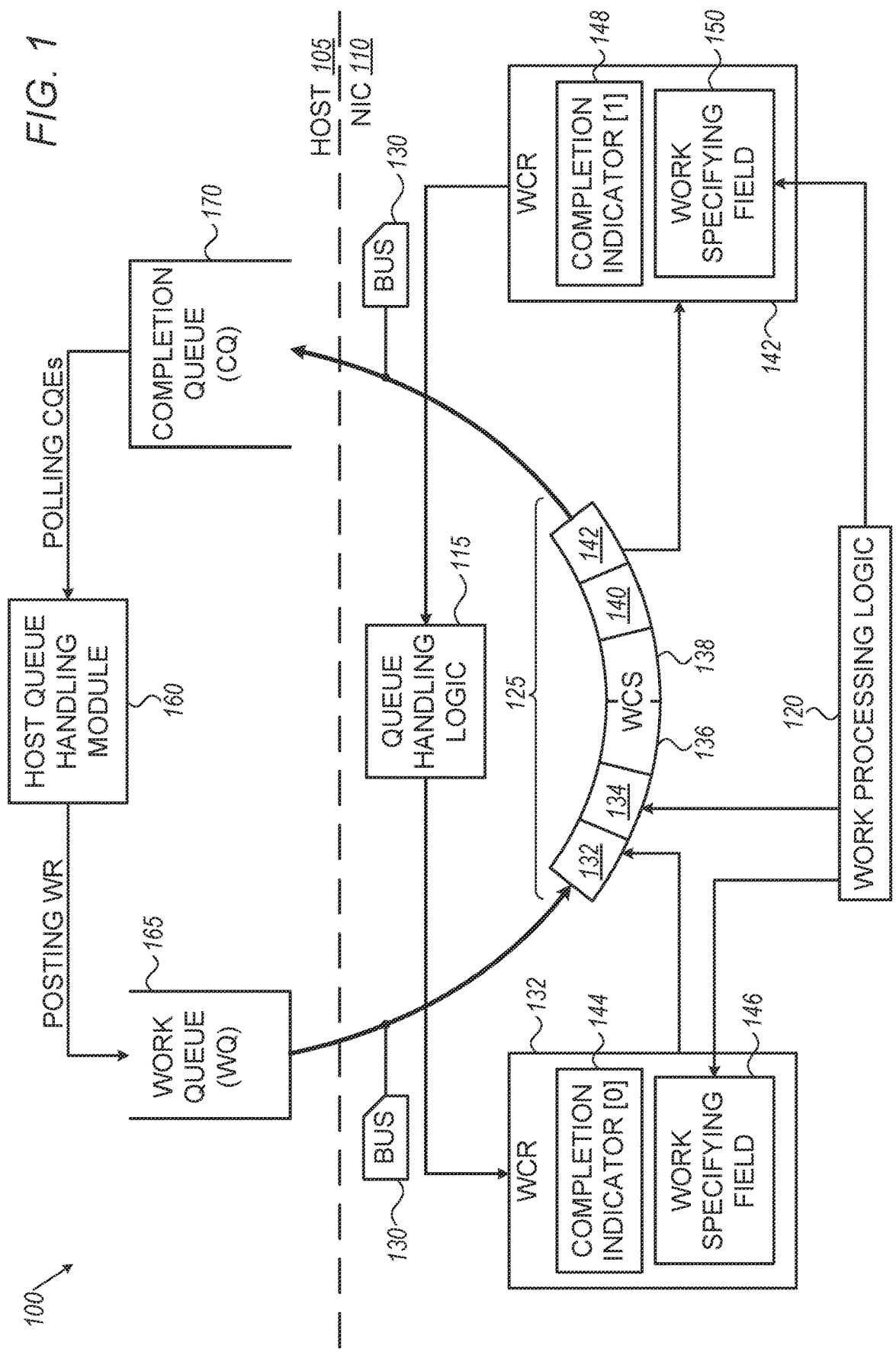
FIG. 1 is a simplified partly pictorial, partly block diagram illustration of a system for reporting task completion, constructed and operative in accordance with an exemplary embodiment of the present invention.

By way of introduction, it is known in certain systems that a Work Queue (WQ) is a structure that is used for interfacing between two entities. For example, and without limiting the generality of the foregoing, a WQ is one method by which an entity (which may be, by way of non-limiting example, a software entity), sometimes known as a requesting entity, running on a host processor (which may also be termed herein a "CPU") may request service from a hardware entity, sometimes known as an executing entity. Such an executing entity may comprise, by way of non-limiting example, a networking device. By way of further non-limiting example, such a executing entity may comprise a network interface controller (NIC) (which may be considered to be a particular type of networking device), a disk controller, or an accelerator device (such as, by way of non-limiting example, a data compressing or decompressing device). The requesting entity generally pushes work requests (WRs) to the WQ; the requesting entity is also sometimes called a producer of the WR. The WRs are executed by the executing entity, sometimes called a consumer of the WR.

For the consumer to signal to the producer that a WR has been completed, a completion queue (CQ) may be used. Completion queue entries (CQEs) are pushed to the CQ by the consumer. Each CQE signals completion of execution of one or more WRs that were posted to the work queue, the WRs having been processed and completed.

A system of the type discussed above is described in U.S. Pat. No. 7,152,122 to Kagan et al, the disclosure of which is hereby incorporated herein by reference.

In a case where the order of WRs beginning execution (or being fetched for execution from the WQ) is also the order of execution completion, that is, the WRs depend on each other, in the sense that execution of an earlier WR is necessary for execution of a later WR to take place, then in general such a later WR can complete only after the predecessor WR had completed, so that CQEs will be pushed to the CQ in the same order as the WRs in the WQ. However, if the order of execution and completion of each one of the WRs is independent of other WRs, then the order in which CQEs are pushed into the CQ may be "random"; that is, the CQEs are not pushed in any particular order.

In the opinion of the inventor of the present invention, there may be benefits in receiving the CQEs from the CQ in the same order that the WRs were posted to the WQ. The present invention, in exemplary embodiments thereof, sees to provide such benefits.

The inventors of the present invention believe that, in general in existing systems before the present invention, pushing CQEs to a completion queue in the same order that the associated WRs were pushed into the work queue, occurs for tasks that actually complete in the same order that they began execution. One non-limiting example of such a situation is reliable connection QP RDMA operations. By contrast, in such existing systems, tasks that complete in a different order than the order that they began execution are often reported to the completion queue with CQEs in the order they completed, which is not necessarily the order in which the associated WRs were posted to the WQ. Such out of order signaling of CQEs may lead to certain burdens on the producer of the WR. First, the CQEs must be reported for each WR. Since a CQE only indicates completion of its associated WR, and does not imply completion of other WRs, one CQE per WR is required. In a case where CQEs are reported in the order the WRs were posted, a CQE indicating a WR completion implicitly indicates completion of predecessor WRs.

Another burden on the WR producer is that the WR producer may need to log and follow the WRs that are completed and released, so the producer can know which WRs can be re-used, since WRs can be recycled (reused) only after they are completed. This burden does not exist with in-order signaling of completion, as is sought to be provided in certain exemplary embodiments of the present invention, since the producer generally needs only to follow the last WR that had been completed, and does not need to follow previous WRs in order to know which WRs can be re-used.

Reference is now made to FIG. 1, which is a simplified partly pictorial, partly block diagram illustration of a system for reporting task completion, constructed and operative in accordance with an exemplary embodiment of the present invention.

The system of FIG. 1, generally designated 100, comprises a host 105 and a networking element 110. Without limiting the generality of exemplary embodiments of the present invention, the networking element 110 is shown in FIG. 1, for purposes of simplicity of depiction and description, as a network interface card (NIC); it is appreciated that any appropriate networking element, such as any appropriate NIC, may be used. Further without limiting the generality of the present invention, it is appreciated that the networking element 110 is itself only one particular example of a device usable in the system of FIG. 1, in that devices not engaging in networking may also be used. Non-limiting examples of other such devices include: a disk controller; and a data accelerator device, such as a data compressing or decompressing device.

It is appreciated that the host 105, while shown in FIG. 1 as comprised in the system 100, may alternatively be external thereto, such that the system 100 may alternatively comprise the networking element 110 without the host 105.

The networking element 110 comprises:
queue handling logic 115; and
work processing logic 120.
The queue handling logic 115 and the work processing logic 120 are described in more detail below.

The networking element 110 is depicted in FIG. 1 as comprising a work control structure (WCS) 125, which is instantiated in hardware memory. The WCS 125 may reside in a memory of the networking element 110 or may reside in another memory accessible to the networking element 110, such as, by way of non-limiting example, in a memory of the host 105, shown in FIG. 1 as accessible to the networking element 110 via a bus 130. The bus 130 is a non-limiting example of communication hardware for communicating between the network element 110 and a memory. The bus 130 may comprise, for example, a PCIe bus or another appropriate bus.

Neither memory of the networking element 110 nor memory of the host 105 are explicitly shown in FIG. 1, for purposes of simplicity of depiction and description. It is appreciated that the WCS 125 may reside in other memory (neither internal to the networking element 110 nor in the host 105), as long as the other memory is accessible to the networking element 110.

The WCS 125 comprises a plurality of work control records (WCRs), depicted in FIG. 1 as WCR 132, WCR 134, WCR 136, WCR 138, WCR 140, and WCR 142. It is appreciated that a smaller or larger plurality of WCRs may actually be comprised in the WCS 125; generally, a much larger plurality of WCRs is comprised in the WCS 125, a smaller plurality being shown in FIG. 1 for simplicity of depiction.

It is appreciated that, in certain exemplary embodiments, the various WCRs may be dynamically allocated by the WCS 125 from a global pool which is also available to other work control structures; likewise, WCRs may, when appropriate, be deallocated by the WCS 125 back to the global pool. In such exemplary embodiments, performance of the system of FIG. 1 may be improved by obviating the necessity of allocation and deallocation of WCRs from "general" memory, rather than from a "dedicated" pool.

The WCR 132 and the WCR 142 are shown in FIG. 1 also in expanded form. The WCR 132 comprises a completion indicator 144, shown as set to 0 (zero), indicating that the unit of work associated with the WCR 132 has not been completed. It will be appreciated that zero is an arbitrary value, and that, alternatively, any appropriate value indicating that the unit of work associated with the WCR 132 has not been completed may be used. The WCR 132 also comprises a work specifying field 146.

The WCR 142 also comprises a completion indicator 148, shown as set to 1 (one), indicating that the unit of work associated with the WCR 142 has been completed. It will be appreciated that one is an arbitrary value, and that, alternatively, any appropriate value indicating that the unit of work associated with the WCR 142 has been completed may be used. The WCR 142 also comprises a work specifying field 150.

While not shown for sake of simplicity of depiction, it will be appreciated that, in general, the WCR 134, the WCR 136, the WCR 138, and the WCR 140 also each comprise a completion indicator and a work specifying field.

Exemplary functioning of the system 100 of FIG. 1, including exemplary use of the completion indicators and work specifying fields as described immediately above, is described below.

The host 105 comprises a host queue handling module 160. The host queue handling module 160 handles: a work queue (WQ) 165, holding work requests (WRs, not shown for sake of simplicity of depiction); and a completion queue (CQ) 170, holding completion queue entries (CQEs, not shown for sake of simplicity of depiction). As is known in the art (and described, for example, in U.S. Pat. No. 7,152,122 to Kagan et al, the disclosure of which has been incorporated herein by reference), the host queue handling module 160 posts WRs to the WQ 165 to indicate that a unit of work is to be done (such as, for example, by a networking element) and polls CQEs from the CQ 170, the CQEs (each associated with a previously-posted WR) indicating that the unit of work indicated by the associated WR has completed. However, at least the following are believed by the inventor of the present invention not to be known in the art: the interaction between the components shown in FIG. 1 as comprised in the host 105 and the components shown in FIG. 1 as comprised in the networking element 110; and the structure and interaction of the components shown in FIG. 1 as comprised in the networking element 110.

An exemplary mode of operation of the system 100 of FIG. 1 is now briefly described.

When a unit of work is to be done (by way of non-limiting example, when a WR is posted by the host queue handling module 160 to the WQ 165), a WCR associated with that unit of work is pushed (typically to the end of) the WCS 125. By way of example, the queue handling logic 115 pushes the WCR 132 to the end of the WCS 125; the WCR 132 has a completion indicator 144 indicating that the unit of work associated with the WCR 132 has not been completed. The WCR 132 also has a work specifying field 146, which specifies (to the work processing logic 120), what work is to be carried out. By way of particular non-limiting example, since in the exemplary embodiment of FIG. 1 various elements are depicted as being comprised in a network element 110 (such as a NIC), the work to be carried out may comprise sending network data. In other non-limiting examples: 1) in a case where the various elements are comprised in a disk controller, the work to be carried out may comprise executing an IO READ from or an IO WRITE to disk media controlled by the disk controller; 2) in a case where the various elements are comprised in an accelerator device, the work to be carried out may comprise compressing data or decompressing data in memory.

The work specified in the work specifying field 146 is carried out by the work processing logic 120. When, in due course, the work specified in the work specifying field 146 has been completed, the work processing logic 120 sets the value of the completion indicator 144 to indicate that the work specified by the work specifying field 146 has been completed. Alternatively, specific logic such as, for example, completion indication logic (not shown) which may be comprised in the work processing logic 120 or elsewhere in the networking element 110, may be responsible for setting the value of the completion indicator 144 to indicate that the work specified by the work specifying field 146 has been completed.

It is appreciated that, as described above, the work specified in work specifying fields in various WCRs in the WCS 125 may be completed other than in the order that the WCRs are pushed into the WCS 125. In order to provide in-order signaling of completion, as described above, the queue handling logic 115 may poll the WCR which is at the head of the WCS 125. Alternatively, the queue handling logic 115 may be configured to detect that the "oldest" WCR in the WCS 125 (the WCR which is at the head of the WCS 125) has a completion indicator 144 indicating that the work associated with that WCR has been completed, and may at that time (in addition to generating a CQE for that "oldest" WCR in the CQ 170) also examine the next WCR in the WCS 125. In short, only when the completion indicator of the WCR at the head of the WCS 125 indicates that the work specified by the work specifying field of the WCR at the head of the WCS 125 has been completed, the queue handling logic pops the WCR from the head of the WCS 125 and indicates that the work has completed (such as, for example, by sending a CQE to the CQ 170 of the host).

Specifically, in FIG. 1, the WCR 142 which is at the head of the WCS 125 is shown with completion indicator 148 set to 1 (one, completed), to illustrate the situation just described.

Persons skilled in the art will appreciate that the above-described exemplary functioning of the system 100 of FIG. 1 will result in in-order signaling of completion, even when units of work specified by the work specifying fields of the WCRs (the WCR 132, the WCR 134, the WCR 136, the WCR 138, the WCR 140, and the WCR 142, for example) are completed other than in order.

It is appreciated that a situation might arise wherein the unit of work specified by a particular WCR is "never" completed, due to some system problem, or is not completed for a very "long" time; the definition of "long" in this context would depend on many parameters of an actual system. To prevent the system of FIG. 1 from "stalling" in such a case, a timeout may be used (by, for example, the queue handling logic 115) such that, when the timeout expires, the completion indicator of the WCR at the head of the WCS is set to "completed", even though the associated work has not in fact completed; in such a case, the completion indicator may optionally also be set with an error indication, to signal to appropriate system components (such as, for example, to components not shown, comprised in the host 105) that an error has occurred.

Reference is now made to FIG. 2, which is a simplified flowchart illustration of an exemplary method of operation of the system of FIG. 1.

The exemplary method of FIG. 2 comprises the following steps, it being appreciated that additional optional steps, not shown in FIG. 2, may also be comprised in the exemplary method. The steps of the exemplary method of FIG. 2 may be carried out, by way of non-limiting example, by the queue handling logic 115 of FIG. 1. The exemplary method of FIG. 2 will be better understood with reference to the above description of FIG. 1.

Upon beginning of a work request (WR) (or upon fetching a WR for execution), a work control request (WCR) corresponding to the WR is pushed to a work control structure (WCS), via communication hardware. (step 210). The WCS may be external to the queue handling logic; in alternative exemplary embodiments, the WCS may be comprised in the queue handling logic.

The following steps in the method are also performed via the communication hardware.

A) The WCR at the head of the WCS is inspected (step 220).

B) When a completion indicator of the WCR at the head of the WCS indicates that a unit of work associated with the WCR at the head of the WCS has been completed: the WCR at the head of the WCS is popped from the WCS; and completion of the WCR at the head of the WCS is reported, generally to an external host processor (step 230).

C) A, B, and C are performed iteratively (step 240).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system, comprising:
   work processing logic, to execute units of work specified by respective Work Requests (WRs) posted on a Work Queue (WQ), the WRs being provided from the WQ to the work processing logic in a first order, but completed by the work processing logic in a second order that differs from the first order;
   a memory, to hold a Work Control Structure (WCS) configured in a First-In-First-Out (FIFO) configuration having a head and a tail, the WCS having a plurality of Work Control Records (WCRs), each WCR of the plurality of WCRs corresponding to a respective WR among the WRs and comprising (i) a work specifying field defining a unit of work of the respective WR, and (ii) a completion indicator indicating whether the respective WR has been completed; and
   queue handling logic, to:
      push a sequence of WCRs to the tail of the WCS, the WCRs being pushed to the WCS in the first order in which the corresponding WRs are provided to the work processing logic for execution;
      identify completed WCRs, whose completion indicators have been set to indicate that the corresponding WRs have been completed by the work processing logic, the completed WCRs being identified in accordance with the first order by repeatedly monitoring only the head of the WCS to identify an oldest completed WCR;
      pop the identified completed WCRs from the head of the WCS; and
      report completion of the WRs corresponding to the popped completed WCRs to a host processor, in accordance with the first order, even though the WRs have been completed in the second order that differs from the first order.

2. The system according to claim 1 and wherein the queue handling logic is to insert a WCR at the tail of the WCS based, at least in part, on a request originating at the host processor.

3. The system according to claim 1 and wherein at least one of said plurality of WCRs is allocated by the WCS from a global pool of WCRs.

4. The system according to claim 1 and wherein the queue handling logic comprises a bus for communicating with the memory.

5. The system according to claim 1, and wherein completion of the WCR at the head of the work queue is reported to an application running on the host processor.

6. The system according to claim 1, and wherein the system is comprised in one of the following: a network element; a disk controller; and an accelerator device.

7. The system according to claim 1, and wherein the system is comprised in a network element, and the network element comprises a network interface card (NIC).

8. The system according to claim 7 and wherein the unit of work to be carried out comprises a data transfer by the NIC over a hardware networking medium.

9. The system according to claim 1, and wherein the system also comprises timeout logic to, upon expiration of a timeout, set the completion indicator of the WCR at the head of the WCS to indicate that the unit of work associated with the WCR at the head of the WCS has completed, even if the unit of work associated with the WCR at the head of the WCS has not completed.

10. The system according to claim 9, and wherein, when the completion indicator of the WCR at the head of the WCS is set to indicate that the unit of work associated with the WCR at the head of the WCS has completed upon expiration of the timeout, the completion indicator of the WCR at the head of the WCS is set to include an error indication.

11. A method, comprising:
    using work processing logic, executing units of work specified by respective Work Requests (WRs) posted on a Work Queue (WQ), the WRs being provided from the WQ to the work processing logic in a first order, but completed by the work processing logic in a second order that differs from the first order;
    holding, in a memory, a Work Control Structure (WCS) configured in a First-In-First-Out (FIFO) configuration having a head and a tail, the WCS having a plurality of Work Control Records (WCRs), each WCR of the plurality of WCRs corresponding to a respective WR among the WRs and comprising (i) a work specifying field defining a unit of work of the respective WR, and (ii) a completion indicator indicating whether the respective WR has been completed; and
    using queue handling logic:
       pushing a sequence of WCRs to the tail of the WCS, the WCRs being pushed to the WCS in the first order in which the corresponding WRs are provided to the work processing logic for execution;
       identifying completed WCRs, whose completion indicators have been set to indicate that the corresponding WRs have been completed by the work processing logic, the completed WCRs being identified in accordance with the first order by repeatedly monitoring only the head of the WCS to identify an oldest completed WCR;
       popping the identified completed WCRs from the head of the WCS; and
       reporting completion of the WRs corresponding to the popped completed WCRs to a host processor, in accordance with the first order, even though the WRs have been completed in the second order that differs from the first order.

12. The method according to claim 11 and wherein inserting a WCR at the tail of the WCS is based, at least in part, on a request originating at the host processor.

13. The method according to claim 11 and wherein at least one of said plurality of WCRs is allocated by the WCS from a global pool of WCRs.

14. The method according to claim 11 and comprising communicating between the queue handling logic and the host processor over a bus.

15. The method according to claim 11, and also comprising reporting completion of the WCR at the head of the work queue to an application running on the host processor.

16. The method according to claim 11, and wherein the queue handling logic is comprised in one of the following: a network element; a disk controller; and an accelerator device.

17. The method according to claim 11, and wherein the queue handling logic is comprised in a network element, and the network element comprises a network interface card (NIC).

18. The method according to claim 17 and wherein the unit of work to be carried out comprises a data transfer by the NIC over a hardware networking medium.

19. The method according to claim 11, and wherein the following is carried out by timeout logic:
   upon expiration of a timeout, setting the completion indicator of the WCR at the head of the WCS to indicate that the unit of work associated with the WCR at the head of the WCS has completed, even if the unit of work associated with the WCR at the head of the WCS has not completed.

20. The method according to claim 19, and wherein, when the completion indicator of the WCR at the head of the WCS is set to indicate that the unit of work associated with the WCR at the head of the WCS has completed upon expiration of the timeout, the completion indicator of the WCR at the head of the WCS is set to include an error indication.

* * * * *